(12) United States Patent
Rampono et al.

(10) Patent No.: US 11,936,608 B1
(45) Date of Patent: Mar. 19, 2024

(54) CONSOLIDATED ORDER STATUS AND TRACKING

(71) Applicant: Checkmate Savings Inc., San Francisco, CA (US)

(72) Inventors: Elliot Rampono, New York, NY (US); Cody George, Sydney (AU); Rory Garton-Smith, Los Angeles, CA (US)

(73) Assignee: Checkmate Savings Inc., San Francisco, CA (US)

( * ) Notice: Subject to any disclaimer, the term of this patent is extended or adjusted under 35 U.S.C. 154(b) by 0 days.

(21) Appl. No.: 18/215,433

(22) Filed: Jun. 28, 2023

(51) Int. Cl.
*G06F 16/00* (2019.01)
*G06Q 10/0833* (2023.01)
*H04L 51/42* (2022.01)

(52) U.S. Cl.
CPC ......... *H04L 51/42* (2022.05); *G06Q 10/0833* (2013.01)

(58) Field of Classification Search
CPC ...................................... H04L 51/42
See application file for complete search history.

(56) References Cited

U.S. PATENT DOCUMENTS

| 9,760,938 | B2 * | 9/2017 | King | G06F 40/174 |
| 2018/0165723 | A1 * | 6/2018 | Wright | G06F 40/30 |

FOREIGN PATENT DOCUMENTS

| CA | 2738428 A1 * | 10/2011 | ............. G06F 16/95 |

* cited by examiner

*Primary Examiner* — Tuankhanh D Phan (57) ABSTRACT

In one embodiment, a method includes accessing an email inbox of a user and determining a set of emails received since a previous access. For each email in the set, the method includes determining whether the email is sent from a domain identified in a domain database; if not, then the method moves to the next email; if yes, then the method iteratively applies a set of email-subject off-ramp criteria to the email's subject. When an off-ramp criterion is met, then the method moves to the next email; if no email-subject off-ramp criterion is met, then the method iteratively applies a set of email-subject on-ramp criteria to the subject of the email. When any email-subject on-ramp criterion is met, then the method determines an order status of an order associated with the email and updates an order tracking database with an entry identifying the order status.

20 Claims, 5 Drawing Sheets

CONSOLIDATED ORDER STATUS AND TRACKING

TECHNICAL FIELD

This application generally relates to consolidated order status and tracking.

BACKGROUND

Online purchasing of goods and services is increasingly replacing purchasing at a physical location, such as a physical retail store. An online or other remote purchase (e.g., a purchase made over the phone) of a good requires that the good be delivered to the user. This applies to physical goods, which must be physically delivered to a user using, for example, a package-delivery service. This also applies to electronic goods, such as programs, files, or streaming content, which must be transmitted to a user, for example when the user downloads a program or streams some purchased content over an internet connection.

Physical and electronic package delivery typically includes tracking the status of an order. Tracking can include a description of an order's status in the purchase and delivery flow. For example, an order's status may be "prepared for shipment," "shipped," "in transit" "out for delivery," "delivery attempted" or "delivered." The status may also include an order's expected delivery date and a status related to that delivery date, e.g., "on time," "delayed," etc. An order's status may include additional information, such as the order's physical location or last known location corresponding to a package-delivery service's facilities.

DESCRIPTION OF EXAMPLE EMBODIMENTS

Many users remotely order products (including physical products and electronic products) from many different sources (e.g., retailers, merchants, etc.). However, order information is typically organized by the source. For example, if a user opens an application provided by Amazon® then the user may be able to view orders placed via Amazon®, but the user will not see orders placed with a different merchant or through a different platform. A user may find order information for a different merchant by, e.g., using that merchant's application or by logging on to the merchant's website, but again, display of order information would be limited to that specific merchant. However, consolidated order information (i.e., information for orders made by a user, regardless of the order's source or seller) is often what is most useful to a user. For example, a user may want to know whether they will be receiving any packages today, or what orders are expected to be delivered over the weekend, so that the user can either plan to be present at the delivery destination (e.g., the user's home) or make plans for the package to be picked up (e.g., by another person). Purely source-based order information (e.g., all orders from only a particular merchant) does not meet the user's needs. Instead, the user must manually review and collect order information across all sources, which requires not only consolidating active order information, but also keeping track of which orders are still active (i.e., not delivered) and which orders are already delivered and therefore no longer need to be tracked.

Merchants or other sources of an order typically send emails to a user's email address regarding aspects of an order. For example, a merchant may send an email when an order is placed, when it is shipped, and/or when it is delivered. However, merchants also often send emails unrelated to a specific order. For example, a merchant may send an email regarding items in a cart the user has created but has not yet completed an order for. As another example, a merchant may send emails regarding sales, products, and/or events that are related to the merchant and/or to products the merchant sells, but are unrelated to any order the user has actually made. In addition, such emails often include similar terms that a user may use to search for order information. For example, a merchant may send an email that urges the user to "Order now!," e.g., with respect to a certain sale or offer. As another example, a merchant may send an email to a user offering discounted shipping (e.g., "free shipping on orders over $50"). Therefore, a user attempting to create consolidated order information using search terms in an email inbox will collect many emails unrelated to any actual order. A user can simply open all emails relating to order status and manually review those emails to make a determination as to whether the email provides information about an order; and if so, then read and extract the relevant order-related information (e.g., estimated deliver dates) and then consolidate all such information together, replacing older information for a particular order with new information, but this manual curation takes an unreasonable amount of effort to be practical.

In contrast, the systems and methods of this disclosure provide a database and user interface (UI) that automatically and accurately consolidates order and package tracking information for a user, regardless of the source of the order. In addition, as explained herein, particular embodiments can actively provide notifications to a user regarding order information (e.g., a delivery notification) regardless of the order's source, meaning that a user does not even need to access an order-related UI or an associated program in order to receive particularly relevant information; instead, such information may be provided via, e.g., a push notification to a client device (e.g., a mobile device) of the user.

As explained herein, the systems and method of this disclosure automatically create consolidated order status and package tracking through the automatic use of specific, objective, and unconventional rules for determining and consolidating order information from a user's email folder (s), such as an inbox. As explained more fully herein, these rules replace the subjective, read-an-email's-text approach that manual review entails, if manual review is done at all.

Figure 1:
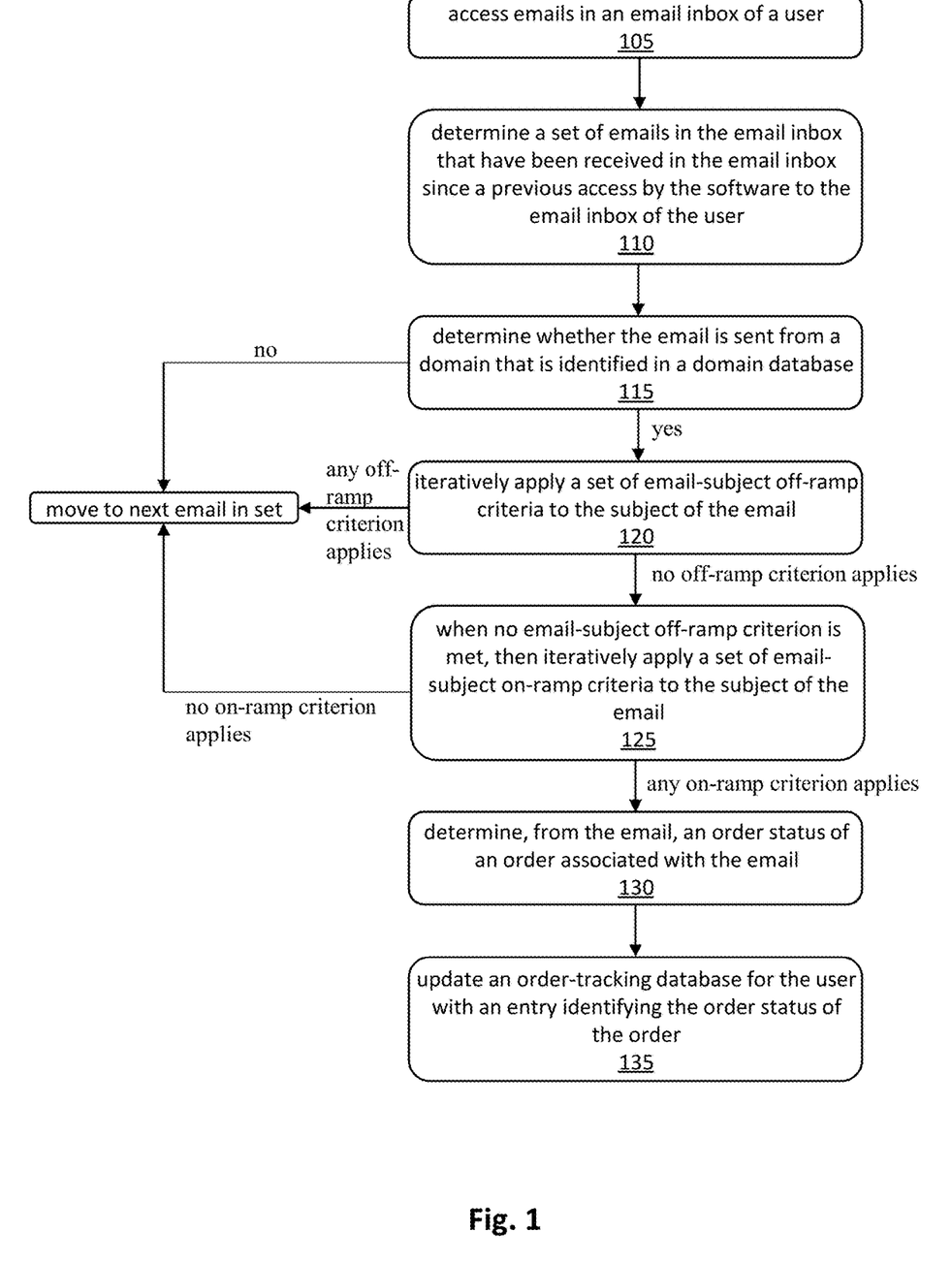
FIG. 1 illustrates an example method of automatically generating consolidated order-tracking data for a user.

FIG. 1 illustrates an example method of automatically generating consolidated order-tracking data for a user. Step 105 of the example method of FIG. 1 includes accessing an email inbox of a user. Access to the user's email inbox has been previously granted by the user. In any particular instance of the method of FIG. 1, access to a user's email folder may be obtained using a refresh token issued by the email provider. While step 105 includes accessing at least an inbox of a user's email, this disclosure contemplates that the system and methods described herein may be used in connection with accessing other folders of a user's email, and may include accessing multiple folders. The method of FIG. 1 may be performed by, e.g., software executing on a computing device such as a server device.

Step 110 of the example method of FIG. 1 includes determining a set of emails in the email inbox that have been received in the email inbox since a previous access by the software to the email inbox. In particular embodiments, the method of FIG. 1 repeats periodically, e.g., every 15 minutes, 30 minutes, 1 hour, etc. In particular embodiments, that period may be set by a user. Step 110 determines the subset of emails from a user's inbox that have not previously been accessed by the software executing the method of FIG. 1, e.g., to avoid duplicate analysis. In particular embodiments, if there are no emails in the set of emails since the previous access, then the process ends. In particular embodiments, a notification may be provided by an email-service provider each time a new email is received in a user's inbox. In these embodiments, step 110 includes accessing the user's email inbox to access this new email, i.e., the set of emails is the one new email.

Starting with the set of emails identified in step 110, the subsequent steps of the example method of FIG. 1 are performed on an email-by-email basis, i.e., for each email in the set. Step 115 of the example method of FIG. 1 includes determining whether the email is sent from a domain that is identified in a domain database. The domain database identifies known providers of products and/or known shipping services. In particular embodiments, step 115 includes identifying the domain directly from the email, for example by using a domain of the sender (e.g., sender@domain.com). In particular embodiments, step 115 may include using the sender's information, such as the sender's name, to identify a domain. In particular embodiments, step 115 may include using other information in an email, such as text or images in the email, that are associated with a known provider, which is then associated with a known domain.

As illustrated in the example of FIG. 1, when the email is determined to be sent from a domain that is not identified in the domain database, then the analysis of that email ends and the process moves to the next email in the set of emails identified in step 115 (or the process ends if there are no other emails in the set to review, e.g., if the set of emails is a single email or if the last emails in the set of emails has been reached). If the end of the set is reached then the method of FIG. 1 ends. When the email is determined to be sent from a domain that is identified in the domain database, then additional steps are performed on the email, as described below.

Step 120 of the example method of FIG. 1 includes iteratively applying a set of email-subject off-ramp criteria, i.e., rules, to the subject of the email. If an email fails any off-ramp rule, then the analysis of that email ends, and that email is discarded from further analysis as irrelevant. The off-ramp criteria constitute a series of rules applied to the emails in the set of emails, and are used to weed likely irrelevant emails from the emails that contain relevant order information.

In particular embodiments, one or more off-ramp criteria focus exclusively on the subject of an email. In particular embodiments, the text (i.e., all characters) in the subject line is extracted and parsed to keep only spaces, letters, numbers, and specific, predetermined special characters, such as any of %, ?, !, $ (or other currency symbol), and #. Other special characters and other content (e.g., emojis) are removed. The cleaned subject text is then subject to a series of off-ramp rules. For example, the first off-ramp rule determines whether the string "free" (here, the spaces before and after "free" are intentionally included) appears in the cleaned subject line text, or whether the subject starts with "free". If either of these conditions apply, then the email is identified as irrelevant.

Another off-ramp rule looks for strings that contain one or more numerical characters that are immediately followed by a "%" symbol. For example, the string "##%", if found in the cleaned subject-line text, results in the email being discarded as irrelevant. Another off-ramp test looks for strings that contain one or more numerical characters that are immediately preceded by a currency symbol. For example, the string "$ #", if found in the cleaned subject-line text, results in the email being discarded as irrelevant. Another off-ramp rule looks for strings that contain "how", an order token, and an "?" in that order, although other words or characters may appear between those strings (e.g., "How did you like your recent order?" would qualify under this off-ramp rule). Here, an order token is any one of a set of words that are generally used to describe an order, e.g., "package," "item," "ship" or related terms (e.g., "shipment," "shipped," etc.), "order" and related terms (e.g., "ordered," etc.).

Step 125 of the example method of FIG. 1 includes applying a set of email-subject on-ramp criteria, or on-ramp rules, to the subject of the email. As explained above, this step is performed only if none of the off-ramp criteria apply to the email. If any on-ramp criterion is met in step 125, then the process moves to step 130. If no on-ramp criterion is met, then the email is discarded from further analysis as irrelevant.

In particular embodiments, one or more on-ramp rules focus exclusively on the subject of an email. For example, one on-ramp rule looks for an order token, followed by a verb token, followed by delivery token. Here, the verb token is the past, present, or future tense of the verbs "is" and "being," including was, is, will, has been, is being, and will be. The package delivery token includes string variants of "delivered," such as "shipped", "dispatched", "arrived", "dropped off", and "departed" or "left" a particular facility. While the examples in the preceding sentence use past tense, particular embodiments look for present or future tense of the package delivery tokens, as well.

As another example, one on-ramp rule looks for shipment confirmation in an email subject, such as "shipment" or "order" and "confirmed" or "confirmation." As another example, one on-ramp rule looks for an order code in an email subject. For example, this on-ramp rule may determine whether an order token is immediately followed by (i.e., the next non-space characters are) a string containing a minimum number of characters (e.g., 5 characters) and a maximum number of characters (e.g., 36 characters). The string must be numbers, letters, or dashes. In particular embodiments, the string must contain more numbers than letters to satisfy this rule. In particular embodiments, a number token (e.g., the "#" symbol, the abbreviation "no." or the word "number," each of which may be followed by a ":" character) is permitted or required to immediately follow the order token, and the string must immediately follow the number token. As another example, one on-ramp rule looks for an order update in an email subject. For example, this rule may involve determining whether an order token is followed by "update" or its conjugates.

As another example, one on-ramp rule looks for, in the email subject, the string "your" followed by an order token, and makes two checks on the strings (if any) between "your" and the order token and the strings (if any) after the order token. If the strings between "your" and the order token do not include any of the strings "next", "first", or a full-stop character (e.g., a period), and if the strings after the order token do not include any of the strings "now" or "before", then the email passes this on-ramp check.

If a particular email has not been discarded as irrelevant during steps 115 through 125, then step 130 of the example method of FIG. 1 includes determining, from that email, an order status associated with the email. For example, particular embodiments may first determine whether an order has already been delivered. Unlike steps 120 and 125, this determination is not confined to data in the email subject line and instead can also include data in the email body and the email timestamp. Notably, an email's body is not accessed by the method of FIG. 1 until step 130, protecting user privacy by subjecting an email to a series of order-related criteria that ensure the email is indeed related to an order before that email's body is accessed.

Particular embodiments of step 130 may determine whether an order has already been delivered by looking for an order token, followed by a past-tense verb token ("was" or "has been"), followed by a past tense delivery token. In particular embodiments, these strings must be within a certain number of strings of each other, e.g., the past-tense verb token must immediately follow the order token. Particular embodiments may check the email timestamp and compare this timestamp to a threshold. If the email is older than the threshold time, then the corresponding product is treated as being delivered. In particular embodiments, a threshold time may be 10 days, two weeks, one month, 35 days, etc. In particular embodiments, a threshold time may be adjustable by a user. This process ensures that relatively old emails related to old orders are not surfaced to a user as part of a new or pending order. For example, an email from 3 years ago may indicate that a package is arriving tomorrow, with no email subsequently sent to the user upon delivery. Treating this 3-year-old order as a pending delivery results in a frustrating user experience, and therefore this process ensures that relatively older orders (as determined by the time threshold) are not surfaced as pending or active orders.

If an order has been determined to be delivered, then particular embodiments include, at step 130, determining a delivery time for the order. For example, particular embodiments may treat the email receipt time as the time at which the order was delivered.

If an email in step 130 has not been determined to have already been delivered, then particular embodiments determine an estimated delivery date for the order. For example, particular embodiments look for any of the strings "arrive" "arrival" "delivery" or "delivered" anywhere in the email, including the body. For each found string, then the next n strings are analyzed (e.g., n=8) to determine whether any of those n strings include a date. Here, a date can be in any suitable form or format, including number formats (e.g., 4/13), alphabetical formats (e.g., "tomorrow" or "Saturday" or "May first"), or a combination of the two (e.g., May 3, 2023). If a date is found in the n strings, then the date is treated as the estimated delivery date for the order. In particular embodiments, if this date is in the past, then the order is assumed to have been delivered.

In particular embodiments, step 130 includes identifying tracking and order information such as tracking codes (a code supplied by the courier to track the package with that courier) and/or order codes (a code specific to a merchant and used to track a particular order from that merchant). Particular embodiments check the entire contents of an email for tracking and order information, including the data within links, which may include tracking codes or order codes. Particular embodiments check for tracking codes by searching for the string "tracking", "tracking code", "track your order", or "tracking number" or its equivalents (e.g., "tracking #", "tracking no.", etc.). Particular embodiments check for order codes by searching for "order" or "order code" or "order number" or its equivalents. When a term is found, the next x strings are checked for a tracking code or an order code. Here, x may be only 1 or 2. In particular embodiments, a string may be identified as a tracking code based on having an alphanumeric length greater than a minimum threshold and less than a maximum threshold. In particular embodiments, each time a code is identified in an email, an email-specific counter associated with that code is incremented, starting from zero. Once the entire email contents are evaluated, the tracking code with the highest counter value is selected as the actual tracking code, and the same process applies for the order codes, as well.

In particular embodiments, step 130 includes determining carrier/courier information for an order. For example, the names of known carriers may be searched for in the email contents. As another example, the format of an identified tracking code may be used to identify the carrier.

In particular embodiments, if neither a tracking code nor an order code is identified in an email, then the email is discarded as irrelevant to this method.

Step 135 of the example method of FIG. 1 includes updating an order-tracking database for the user with an entry identifying the order status. In particular embodiments, this update may occur only when at least one of a tracking code or an order code is identified in the email. In particular embodiments, step 135 may include creating a row in the database if a row does not already exist for the identified order code or tracking code and the user. In particular embodiments, step 135 includes updating a row's information in the database when a row already exists in the database that corresponds to the same tracking code or order code and the user. In particular embodiments, only one row is allowed in the database per order/user combination, as each row corresponds to a UI element for display to a user, and duplicate elements related to a single order create a confusing and frustrating user experience.

For example, right after a user places an order, the user may receive an order confirmation with an order code. This order code may be identified and a new row may be placed in the database. The row may include a key uniquely identifying the order, which may include the user's email address or the user's username for the service executing the method, a merchant ID (which may be a string unique to that merchant), and a tracking code (if one exists) or an order code. The row may include additional information, such as the estimated delivery date, the carrier information, etc. Some time after receiving the order confirmation email, the user may receive an email containing both an order code and tracking code. The existing row corresponding to the user/order combination may be identified and the key updated by replacing the order code with the tracking code. Other information, such as the estimated delivery, may also be updated.

Figure 2:
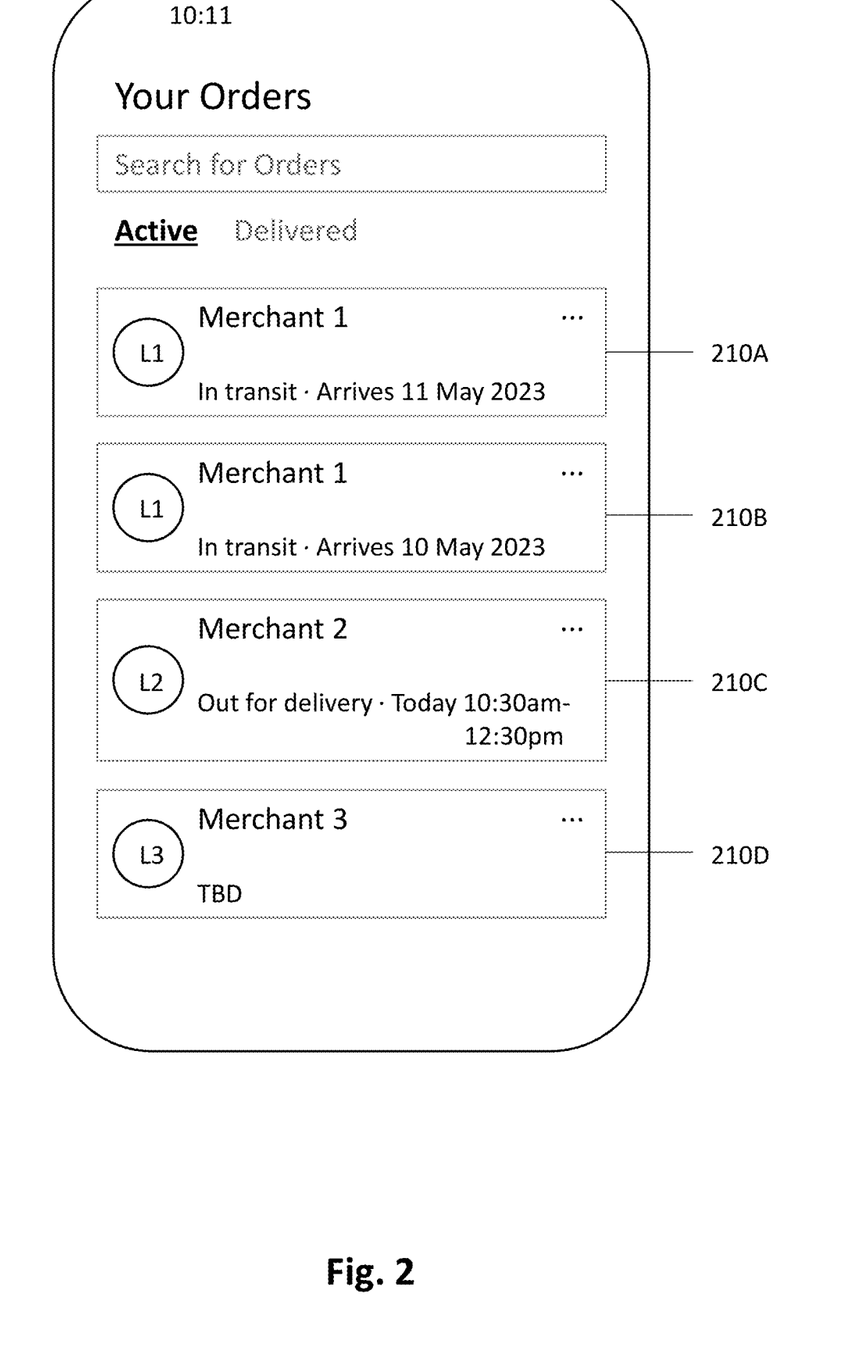
FIG. 2 illustrates an example UI that pulls from the portion of the database corresponding to the user to consolidate order information for that user.
Figure 3:
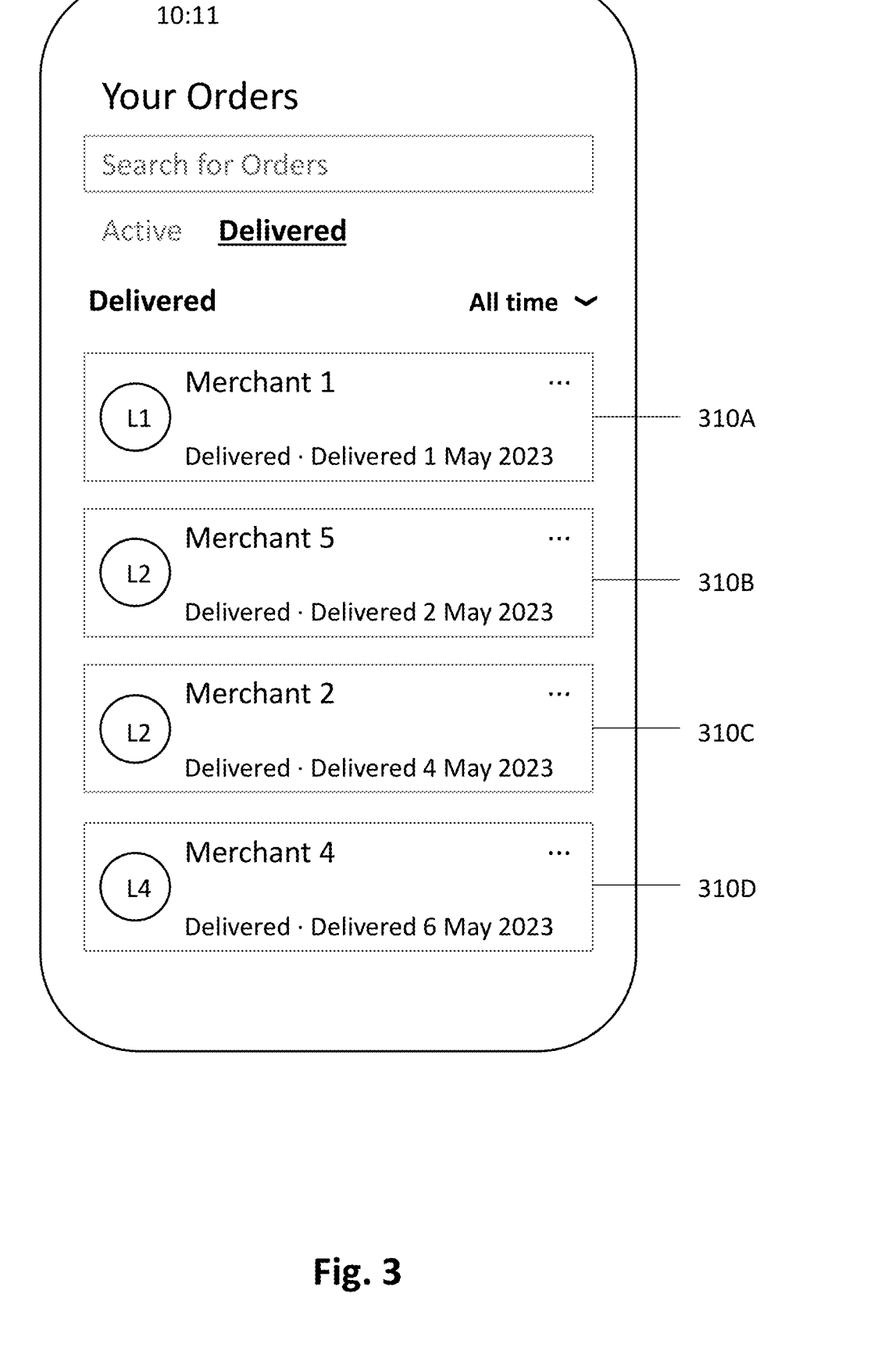
FIG. 3 illustrates an example UI when the "Delivered" tab of the example of FIG. 2 is selected.

FIG. 2 illustrates an example UI that pulls from the portion of the database corresponding to the user to consolidate order information for that user across various merchants. In the example of FIG. 2, the UI includes elements 210A, 210B, 210C, and 210D, each of which corresponds to a particular order placed by the user (and, in particular embodiments, each of which corresponds to a particular row in the database). In the example of FIG. 2, each element 210 includes a logo (e.g., L1, L2, L3) corresponding to the merchant associated with that order. Each element 210 also includes a description of the merchant name (e.g., Merchant 1) and some details about that order's status, which in the example of FIG. 2 includes a description of the current stage in the delivery process (e.g., out for delivery, in transit, etc.) and an estimated delivery time, or an indication that order status information is pending (e.g., TBD). As illustrated in the example of FIG. 2, a UI may include an "active" tab, which corresponds to orders that have been identified as not yet being delivered, and a "delivered" tab, which corresponds to orders that have been identified as orders that have been delivered. FIG. 3 illustrates an example UI when the "Delivered" tab is selected, which illustrates a number of elements 310A, 310B, 310C, and 310D, each of which corresponds to a particular delivered order. In the view corresponding to either tab, in particular embodiments, a user may scroll through orders, organize orders (e.g., by date, by merchant, etc.), and may search order content.

Figure 4:
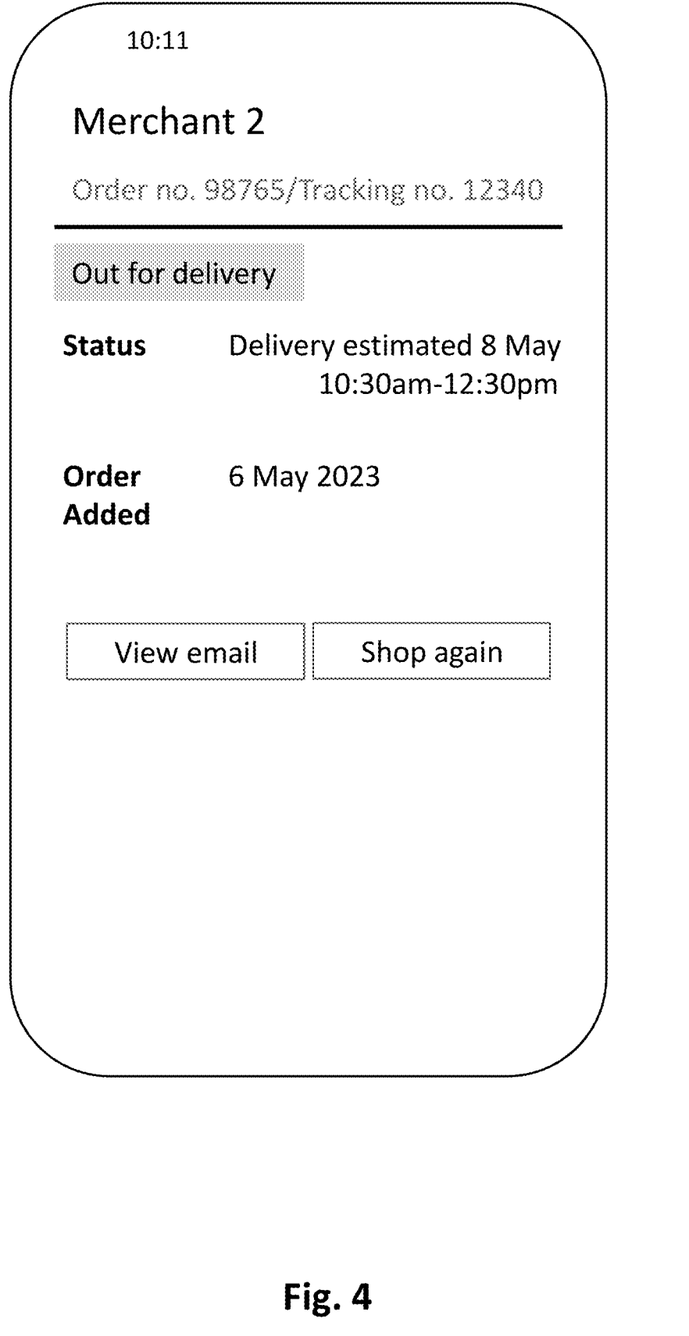
FIG. 4 illustrates an example UI when a user selects element 210C in the example of FIG. 2.

In particular embodiments, a user can select a UI element to transition to a display revealing more information about the order. FIG. 4 illustrates an example display when a user selects element 210C in the example of FIG. 2. The display provides more information about the order, including an order number (if available) a tracking number (if available), an order status, an estimated delivery time (or a time delivered, if the order is determined to have been delivered), and a time the order was added to the order-consolidation platform. Additional content may include selectable elements to view the latest email associated with this particular order or to access the merchant's application or website.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, such as the computer system of FIG. 5, this disclosure contemplates any suitable combination of any suitable components, devices, or systems carrying out any suitable steps of the method of FIG. 1. Moreover, this disclosure contemplates that some or all of the computing operations described herein, including the steps of the example method illustrated in FIG. 1, may be performed by circuitry of a computing device, for example the computing device of FIG. 5, by a processor coupled to non-transitory computer readable storage media, or any suitable combination thereof.

Particular embodiments may augment the example method of FIG. 1 with one or more processes directed to emails sent from a particular merchant, for example a high-volume merchant that sends emails in a consistent, particular format. For example, after step 115, particular embodiments may extract and clean the email text (e.g., by removing new line characters and other extraneous characters), including from the email subject line. In particular embodiments, if the email subject line does not include a tracking code of a particular predetermined format, then the email may be discarded as irrelevant to this process. If the email subject does include a tracking code, then particular embodiments may look at the subject line, and/or the text, for the word "delivered," and if found, the order will be treated as delivered. In particular embodiments, the order delivery time may be treated as the email receipt time. If the order has not been determined to be delivered, then the email text may be searched for key words associated with that merchant's order-related emails to determine the order's estimated delivery. For example, the terms "arrival" "arrive" and "delivery time" may be key words for a merchant, and if a key word is found, the next y strings following the key term are searched for strings that include a date, whether in numerical, alphabetical, or alphanumeric format. If a date is found, then this date is treated as the estimated delivery date for that order. If the estimated delivery date is in the past, then the order is treated as if it has been delivered. In particular embodiments, certain merchant-specific strings may result in exiting the process (i.e., may result in treating the email as irrelevant) if any of those strings are identified in an email. For example, "payment due" may result in an email being determined to be irrelevant for a particular merchant, but that phrase may not have the same effect for any other merchants.

While this disclosure focuses on accessing and searching emails, the methods and systems described herein may be used to access and search any suitable electronic messages of a user, such as text messages, etc. as long as a user grants access to these data sources.

Figure 5:
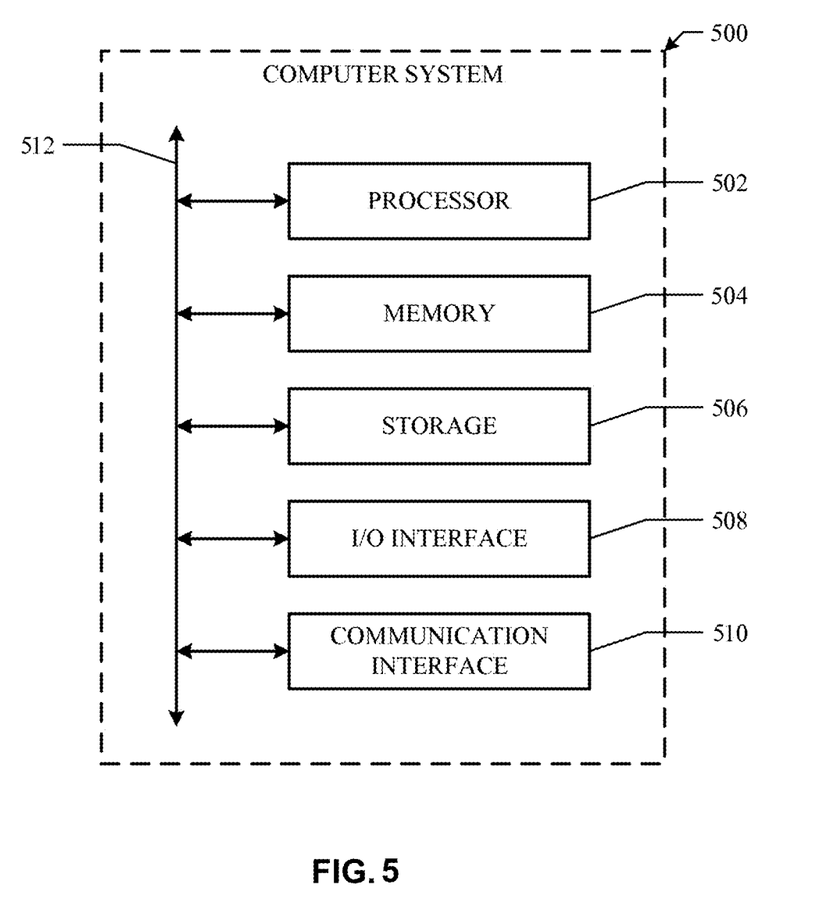
FIG. 5 illustrates an example computing system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. One or more non-transitory computer readable storage media embodying software that, when executed by one or more processors coupled to the media, is operable to:
   access a user's email inbox and one or more emails in the email inbox of the user;
   determine a set of emails in the email inbox that have been received in the email inbox since a previous access by the software to the email inbox of the user;
   for each email in the set of emails:
      determine, based on a content of the email, whether the email is sent from a domain that is identified in a domain database identifying a plurality of domains;
      when the email is determined to be sent from a domain that is not identified in the domain database, then move to the next email in the set of emails;
      when the email is determined to be sent from a domain that is identified in the domain database, then:
         iteratively apply a set of email-subject off-ramp criteria to the subject of the email;
         when an email-subject off-ramp criterion is met, then move to the next email in the set of emails;
         when no email-subject off-ramp criterion is met, then iteratively apply a set of email-subject on-ramp criteria to the subject of the email;
         when any email-subject on-ramp criterion is met, then:
            determine, from the email, an order status of an order associated with the email; and
            update an order-tracking database for the user with an entry identifying the order status of the order.

2. The media of claim 1, wherein the software is further operable to, when executed by one or more processors coupled to the media:
   receive, from a client device of the user, a request to view order status information associated with the user;
   access the order-tracking database for the user, wherein each entry in the order-tracking database is associated with a unique order for the user; and
   provide to the client device for presentation on a display of the client device information associated with a plurality of entries in the order-tracking database for the user.

3. The media of claim 2, wherein each entry in the order-tracking database for the user is associated with a separate UI element for display on the client device.

4. The media of claim 1, wherein the software is further operable to, when executed by one or more processors coupled to the media:
   when the order status of an order associated with the email indicates that the order was delivered, then determine whether a corresponding entry for the order in the order-tracking database for the user identifies the order as delivered; and
   when a corresponding entry for the order in the order-tracking database does not identify the order as delivered, then transmit a push notification to a client device of the user, the push notification including a description of the order as having been delivered.

5. The media of claim 1, wherein a first off-ramp criterion from the set of off-ramp criteria comprises determining whether the string "free" appears in a subject of the email.

6. The media of claim 1, wherein a second off-ramp criterion from the set of off-ramp criteria comprises determining whether either of the following strings appears in a subject of the email:
- a number immediately followed by a percent symbol (%); or
- a currency symbol immediately followed by a number.

7. The media of claim 1, wherein a third off-ramp criterion from the set of off-ramp criteria comprises determining whether a subject of the email includes a string "how" before an order token, and includes the order token before a question mark symbol.

8. The media of claim 1, wherein a first email-subject on-ramp criterion comprises determining whether an email subject includes an order token before a verb token, and includes the verb token before a delivery token.

9. The media of claim 1, wherein a second email-subject on-ramp criterion comprises determining whether an email subject includes an order token immediately before a string comprising:
- any of letters, numbers, and dashes;
- a number of characters that is greater than a predetermined minimum threshold and that is less than a predetermined maximum threshold.

10. The media of claim 1, wherein determining, from the email, an order status of an order associated with the email comprises determining, from the email, whether the order has been delivered.

11. The media of claim 10, wherein the software is further operable to, when executed by one or more processors coupled to the media, determine that the order has been delivered by:
- accessing a timestamp associated with the email;
- comparing the timestamp to a threshold time; and
- when the timestamp is older than the threshold time, then determining that the order has been delivered.

12. The media of claim 10, wherein the software is further operable to, when the order has not been determined to have been delivered and when the software is executed by one or more processors coupled to the media, determine an estimated arrival date for the order.

13. The media of claim 12, wherein determining an estimated arrival date for the order comprises:
- determining that any of an arrival token comprising "arrive" "arrival" "delivery" or "delivered" appears in the email;
- determining whether a date string appears within n strings after the arrival token, wherein n is a predetermined number; and
- when a date string appears within n strings of the arrival token, then determining the date string as the estimated arrival date for the order.

14. The media of claim 1 wherein determining, from the email, an order status of an order associated with the email comprises determining one or more of a tracking code or an order code in the email.

15. The media of claim 14, wherein the software is further operable to, when executed by one or more processors coupled to the media:

when no tracking code or order code is identified in the email, then move to the next email in the set of emails; and when one or more of a tracking code or an order code is identified, then update the order-tracking database for the user with the entry identifying the order status of the order.

16. The media of claim 14, wherein the software is further operable to, when executed by one or more processors coupled to the media:
- determine whether the email is sent from a domain associated with specific rules for determining whether the email relates to an order; and
- when the email is sent from a domain associated with specific rules, then applying those specific rules to the email instead of the email-subject off-ramp criteria and the email-subject on-ramp criteria.

17. A method comprising:
- accessing a user's email inbox and one or more emails in the email inbox of the user;
- determine a set of emails in the email inbox that have been received in the email inbox since a previous access to the email inbox of the user;
- for each email in the set of emails:
  - determining based on a content of the email, whether the email is sent from a domain that is identified in a domain database identifying a plurality of domains;
  - when the email is determined to be sent from a domain that is not identified in the domain database, then moving to the next email in the set of emails;
  - when the email is determined to be sent from a domain that is identified in the domain database, then:
    - iteratively applying a set of email-subject off-ramp criteria to the subject of the email;
    - when an email-subject off-ramp criterion is met, then moving to the next email in the set of emails;
    - when no email-subject off-ramp criterion is met, then iteratively applying a set of email-subject on-ramp criteria to the subject of the email;
    - when any email-subject on-ramp criterion is met, then:
      - determining, from the email, an order status of an order associated with the email; and
      - updating an order-tracking database for the user with an entry identifying the order status of the order.

18. The method of claim 17, further comprising:
- when the order status of an order associated with the email indicates that the order was delivered, then determining whether a corresponding entry for the order in the order-tracking database for the user identifies the order as delivered; and
- when a corresponding entry for the order in the order-tracking database does not identify the order as delivered, then transmitting a push notification to a client device of the user, the push notification including a description of the order as having been delivered.

19. The method of claim 17, wherein determining, from the email, an order status of an order associated with the email comprises determining, from the email, whether the order has been delivered.

20. A system comprising one or more non-transitory computer readable storage media storing instructions; and one or more processors coupled to the non-transitory computer readable storage media, the one or more processors operable to execute the instructions to:

access a user's email inbox and one or more emails in the email inbox of the user;
determine a set of emails in the email inbox that have been received in the email inbox since a previous access by the software to the email inbox of the user;
for each email in the set of emails:
  determine based on a content of the email, whether the email is sent from a domain that is identified in a domain database identifying a plurality of domains;
  when the email is determined to be sent from a domain that is not identified in the domain database, then move to the next email in the set of emails;
  when the email is determined to be sent from a domain that is identified in the domain database, then:
    iteratively apply a set of email-subject off-ramp criteria to the subject of the email;
    when an email-subject off-ramp criterion is met, then move to the next email in the set of emails;
    when no email-subject off-ramp criterion is met, then iteratively apply a set of email-subject on-ramp criteria to the subject of the email;
    when any email-subject on-ramp criterion is met, then:
      determine, from the email, an order status of an order associated with the email; and
      update an order-tracking database for the user with an entry identifying the order status of the order.

* * * * *